(12) United States Patent
Joergensen

(10) Patent No.: US 7,036,421 B2
(45) Date of Patent: May 2, 2006

(54) DRIVING DEVICE, PARTICULARLY LIFTING DEVICE FOR A WORKING VEHICLE

(75) Inventor: Martin Raadkjaer Joergensen, Soenderborg (DK)

(73) Assignee: Sauer-Danfoss (Nordborg) A/S, Nordborg (DK)

( * ) Notice: Subject to any disclaimer, the term of this patent is extended or adjusted under 35 U.S.C. 154(b) by 76 days.

(21) Appl. No.: 10/797,684

(22) Filed: Mar. 9, 2004

(65) Prior Publication Data

US 2004/0177749 A1 Sep. 16, 2004

(30) Foreign Application Priority Data

Mar. 10, 2003 (DE) .................... 103 10 314

(51) Int. Cl.
*F15B 11/08* (2006.01)
(52) U.S. Cl. ............................. 91/32; 91/404
(58) Field of Classification Search ............ 91/32, 91/33, 443, 446, 404–409
See application file for complete search history.

(56) References Cited

U.S. PATENT DOCUMENTS

| | | | |
|---|---|---|---|
| 2,780,204 A * | 2/1957 | Barley | 91/6 |
| 3,044,266 A * | 7/1962 | Svenson | 91/443 |
| 3,516,498 A | 6/1970 | Schowalter | |
| 4,132,272 A | 1/1979 | Holloway et al. | |
| 4,344,499 A | 8/1982 | van der Lely et al. | |
| 4,846,283 A | 7/1989 | Batcheller | |
| 5,287,885 A * | 2/1994 | Smith | 91/443 |

FOREIGN PATENT DOCUMENTS

| | | |
|---|---|---|
| DE | 3522823 | 1/1987 |
| DE | 4028887 | 3/1992 |
| EP | 0 838 140 A1 | 4/1998 |

* cited by examiner

Primary Examiner—Edward K. Look
Assistant Examiner—Igor Kershteyn
(74) Attorney, Agent, or Firm—McCormick, Paulding & Huber LLP

(57) ABSTRACT

The invention concerns a driving device, particularly a lifting device for a working vehicle, with a drive in the form of a hydraulic motor, the drive having a first connection and a second connection, a pump and a control valve arrangement between the drive and the pump. It is endeavoured to provide a simple way of extending the functionality of such lifting devices. For this purpose, the control valve arrangement can be switched from a first operating state, in which the motor is driven in a single-acting manner, to a second operating state, in which the motor is driven in a double-acting manner.

10 Claims, 3 Drawing Sheets

DRIVING DEVICE, PARTICULARLY LIFTING DEVICE FOR A WORKING VEHICLE

CROSS-REFERENCE TO RELATED APPLICATIONS

This application is entitled to the benefit of and incorporates by reference essential subject matter disclosed in German Patent Application No. 103 10 314.7 filed on Mar. 10, 2003.

FIELD OF THE INVENTION

The invention concerns a driving device, particularly a lifting device for a working vehicle, with a drive in the form of a hydraulic motor, said drive having a lifting connection and a lowering connection, a pump and a control valve arrangement between the drive and the pump.

BACKGROUND OF THE INVENTION

Such a driving device in the form of a lifting device is known from, for example, DE 35 22 823 A1.

In the following, the invention will be described on the basis of a tractor, the lifting device being formed by the so-called toolbar (hitch). Attachments are fixed to the toolbar, for example, a plough, a harrow or a mowing tool. By means of the drive, the attachments can then be brought to the right working height, so that, for example, a plough can be lowered by a predetermined depth into the earth.

However, the invention can also be used with other working vehicles and drives, for example, with scavengers, whose sweeping tool must be lifted or lowered.

In most cases, a single-acting drive is sufficient, as it is merely required to lift the attachment, which is fixed on the lifting device. When this attachment has to be lowered, this is done by means of the own weight of the attachment.

A double-acting drive is described in EP 0 838 140 A1. The drive shown in this document cannot merely lift the attachment, but is also used to perform a deliberate lowering.

In practice, double-acting drives are barely found on such lifting devices. Even though the manufacturing effort required for realising a double-acting drive is relatively small compared with a single-acting drive, single-acting drives are chosen, as the control of a single-acting drive is much easier for the user.

Based on the foregoing, it is the general object of the present invention to provide a simple way of extending the functionality of the lifting device.

SUMMARY OF THE INVENTION

With a lifting device as described in the background, this task is solved in that from a first operating state, in which the motor is driven in a single-acting manner, the control valve arrangement can be switched to a second operating state, in which the motor is driven in a double-acting manner.

With this embodiment, the advantages of a single-acting drive, namely the simple operation, are combined with the additional advantages of a double-acting drive. With a double-acting drive, it is, for example, possible not only to use the lifting device for lifting an attachment, but also to press the lifting device downward, with or without a fixed attachment. With such a pressing, it is possible to lift the working vehicle on the side, on which the lifting device is arranged. When this is the tail, it is possible, by means of the lifting device, to lift the vehicle so much that the rear wheels can be changed, chains can be mounted or twin wheels can be mounted. To facilitate the understanding of the following, the word "lifting connection" is used for the first connection, and the word "lowering connection" is used for the second connection.

Now, the control valve arrangement can, when merely a single-acting drive is required, be operated in the first operating state. The driver of the working vehicle no longer has to readjust. He can control and operate the vehicle as usual. In the case, where a double-acting drive is required, the control valve arrangement is switched over. Only in this case, the driver has to accept a somewhat different reaction of the vehicle. Then, however, he can use the advantages of the double-acting drive, for example the lifting of the vehicle, to change a wheel.

Preferably, the motor is in the form of a hydraulic cylinder. Instead of one single hydraulic cylinder, of course also several hydraulic cylinders connected in parallel can be used. A hydraulic cylinder is a particularly simple design of a motor, which is merely needed for lifting and lowering.

It is also preferable that the control valve arrangement has a control valve for the control of one movement direction of the mo-torn and a change-over valve, with which the motor can be switched between its single-acting function and its double-acting function. Thus, to a high degree, the design and the function of the control valve arrangement are maintained. By means of the control valve, which substantially has the form of a directional valve, it can be chosen, whether the load fixed on the lifting device has to be lifted or lowered. In most cases, the speed, with which the load shall be lifted or lowered, can also be set on the control device. Further measures, such as a position control or a position limitation, can also be realised in the control valve. However, this will not be explained further in the following. The user can thus control the lifting device, as known from the state of the art. Merely, when the additional function of the double action of the drive is required, the user switches the changeover valve over. When the changeover valve has been switched over, the motor cannot only lift upwards, but also press downwards.

Preferably, the changeover valve is located between the control valve and the motor. In this case, a change of the usual behaviour of the lifting device is not to be expected, unless the changeover valve is activated.

Preferably, the changeover valve is connected with the second connection of the motor. In order to facilitate the distinction between the connections of motor, the terms "lifting connection" and "lowering connection" were introduced above. The lifting connection, or the first connection, is the connection of the motor, which is supplied with pressurised hydraulic fluid, when the motor is to lift a load, for example an attachment. The lowering connection, or the second connection, is the connection of the motor, through which hydraulic fluid flows into the motor, when the load is lowered. During single-acting operation, this fluid is merely sucked from the tank. During double-acting operation, this fluid is then supplied under pressure by the pump. The supply of fluid from the pump to the lowering connection takes place via the changeover valve. When the changeover is connected directly with the lowering connection, the control is relatively simple.

Preferably, the changeover valve is pilot-controlled via the control valve. By means of the control valve, which usually only specifies the direction of movement of the drive, it is then also possible to select the function, that is, to switch over from single-acting operation to double-acting operation. The function selected is then determined by the position of the control valve.

Preferably, the control valve sets a double-acting function of the drive in an area, in which the lowering speed is in the lower end of the speed range of the drive. Thus, the double-acting function of the motor is chosen, when the lowering speed is low. This reduces the risk of damage caused by an unskilled or incorrect operation of the lifting device. In most of the cases, in which the double-acting function of the drive is required, a slow lowering speed is desired anyway, for example when lifting the vehicle.

Preferably, the control valve has a locking position, in which the changeover valve is locked in a position, in which the connection of the motor connected with the changeover valve is closed. With such a locking position, the lifting device can be locked in any assumed position. This is particularly expedient, when, by means of the lifting device, the vehicle has been lifted and the user intends to perform assembly work. When the user has previously switched the control valve to the locked position, he can work on the vehicle without having to fear that the vehicle is lowered in an uncontrolled manner.

Preferably, the changeover valve can be activated electrically. This electrical activation can, for example, take place in that the changeover valve is a solenoid valve. However, it can also be done in that a pilot valve in the form of a solenoid valve is electrically activated, thus performing a hydraulic pressure on a slide (or another operating element) of the changeover valve, so that eventually the changeover valve switches over.

Preferably, a controllable non-return valve is located between the pump and the first connection, which non-return valve can be opened by a pressure in front of the changeover valve. This embodiment permits a controlled lowering of a load located on the lifting device. When the change-over valve is in a position, in which the drive is single-acting, the pressure from the pump can only get as far as the changeover valve anyway, where it builds up the pressure required for opening the non-return valve. When, however, the changeover valve has been switched to the double-acting position, the pressure from the pump can get through the changeover valve. However, the pressure in front of the changeover valve will increase anyway, as firstly, the non-return valve prevents the discharge of fluid from the motor. Not until the lowering pressure in the motor has increased to a predetermined value, the pressure in front of the changeover valve gets so high that it is sufficient for opening the non-return valve.

It is preferred that the changeover valve has a throttle, which, in the single-acting position, connects an LS-line of the lowering connection with a tank connection. Usually, the connection of the motor, which has the higher pressure, is connected with the LS-system, that is, the load-sensing system of the hydraulic circuit of the vehicle. Assuming that the full pressure at the lowering connection should act upon the LS-system, disproportionately high pressures would occur, which are in principle pointless for the intended application, as, in most cases, the load in question merely has to be lowered anyway. Assuming, however, that this LS-line would be connected directly with the tank, no pressure would build up, which would be required for opening the non-return valve. The use of a throttle offers a compromise. A pressure will build up in front of the throttle, which is sufficient to let the pump pressure increase so much that the non-return valve can be opened.

BRIEF DESCRIPTION OF THE DRAWINGS

In the following, the invention is described in detail on the basis of preferred embodiments in accordance with the drawings, showing.

DETAILED DESCRIPTION OF THE PREFERRED EMBODIMENTS

Figure 1:
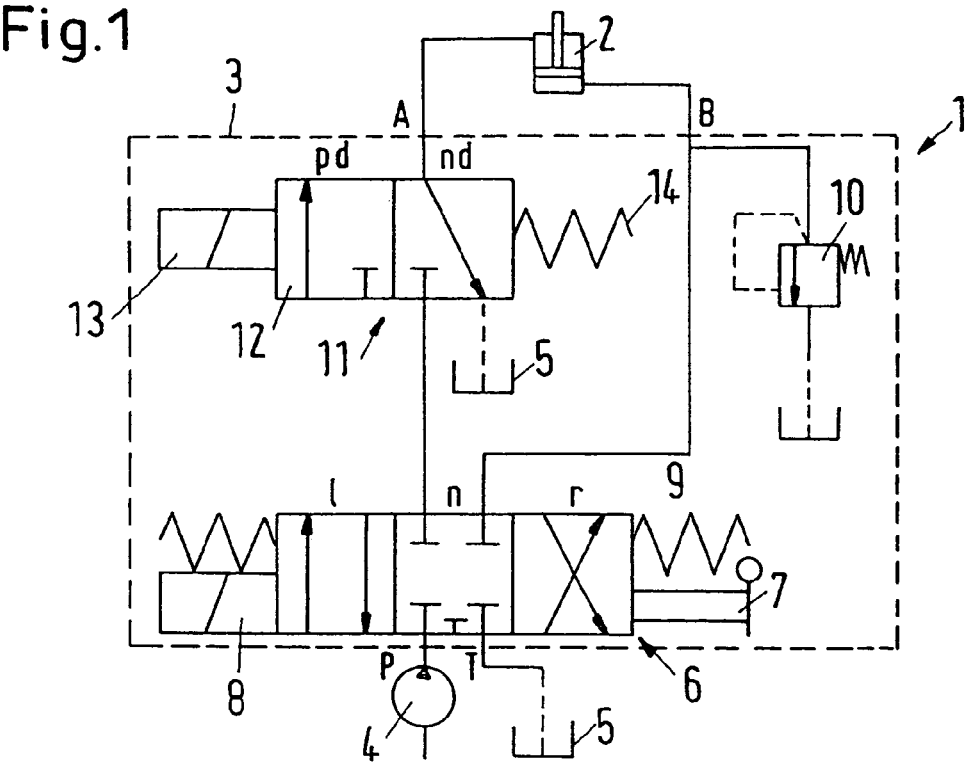
FIG. 1 shows a first embodiment of a lifting device

FIG. 1 shows a lifting device on a vehicle, not shown in detail, with a hydraulic motor 2 in the form of a hydraulic cylinder. The motor 2 is connected with a control valve arrangement 3, which has a pump connection P, which is connected with a pump 4 and a tank connection T, which is connected with a tank 5. The control valve arrangement 3 has a lowering connection A and a lifting connection B. The lifting connection B is the connection, through which the motor 2 is supplied with hydraulic fluid, when the motor 2 is lifting a load, not shown in detail. The lowering connection A is the connection, through which the motor 2 is supplied with hydraulic fluid, when the load is lowered. As will be explained in the following, the supply of hydraulic fluid via the lowering connection can take place in two different ways.

In a manner known per se, the control valve arrangement 3 has a control valve 6, which can be activated by means of a handle 7 or an electromagnet 8. The control valve 6 has a slide 9, which can assume three positions. In FIG. 1, the slide 9 is in the neutral position n. When the slide 9 is displaced to the left, it is in a lifting position r ("raise"). In this position, the pump connection P is connected with the lifting connection B, and pressurised hydraulic fluid is supplied to the motor 2. When the slide is moved from the neutral position n shown in FIG. 1 to the right, it is in a lowering position l ("lower"), in which the lifting connection B is connected with the tank connection T.

As shown schematically, an overpressure valve 10 branches off from the line between the control valve 6 and the lifting connection B, said valve discharging too high pressures.

Between the control valve 6 and the lowering connection A is located a change-over valve 11 with a slide 12, which can be displaced against the force of a spring 14 via an electromagnet 13. In the position nd of the slide 12 shown in FIG. 1, the lowering connection A is connected with the tank 5. In this position nd of the change-over valve 11, the control valve arrangements acts in the usual way, that is, the motor 2 is controlled in a single-acting operation. In order to lift a load by means of the motor 2, fluid is supplied to the lifting connection B via the control valve 6. Fluid, which is displaced from the motor 2 via the lowering connection A reaches the tank 5. When the load is lowered, fluid from the lifting connection B is discharged to the tank 5 via the control valve 6. Via the lowering connection A, fluid is sucked from the tank 5. The position of the slide 12 shown in FIG. 1 is therefore called normal position nd (normal down).

When, however, the slide 12 is displaced to the right into a position pd (power down), pressurised fluid can be supplied to the lowering connection A, in the position l of the slide 9 of the control valve. When the control valve 6 has been brought to the position l, and at the same time the change-over valve 11 is in the position pd, a through fluid path is created from the pump connection P to the lowering connection A, and the motor 2 is double-acting, that is, it cannot only lower the load, but it can exert a downwards force. When, for example, the load has reached the earth, and the motor 2 continues to work downwards, the vehicle can be lifted.

Also when the changeover valve 11 is in the position pd, the motor 2 can lift a normal load. In this case, the fluid displaced via the lowering connection A reaches the tank connection T and thus the tank 5 via the changeover valve 11 and the control valve 6 in the position r.

Figure 2:
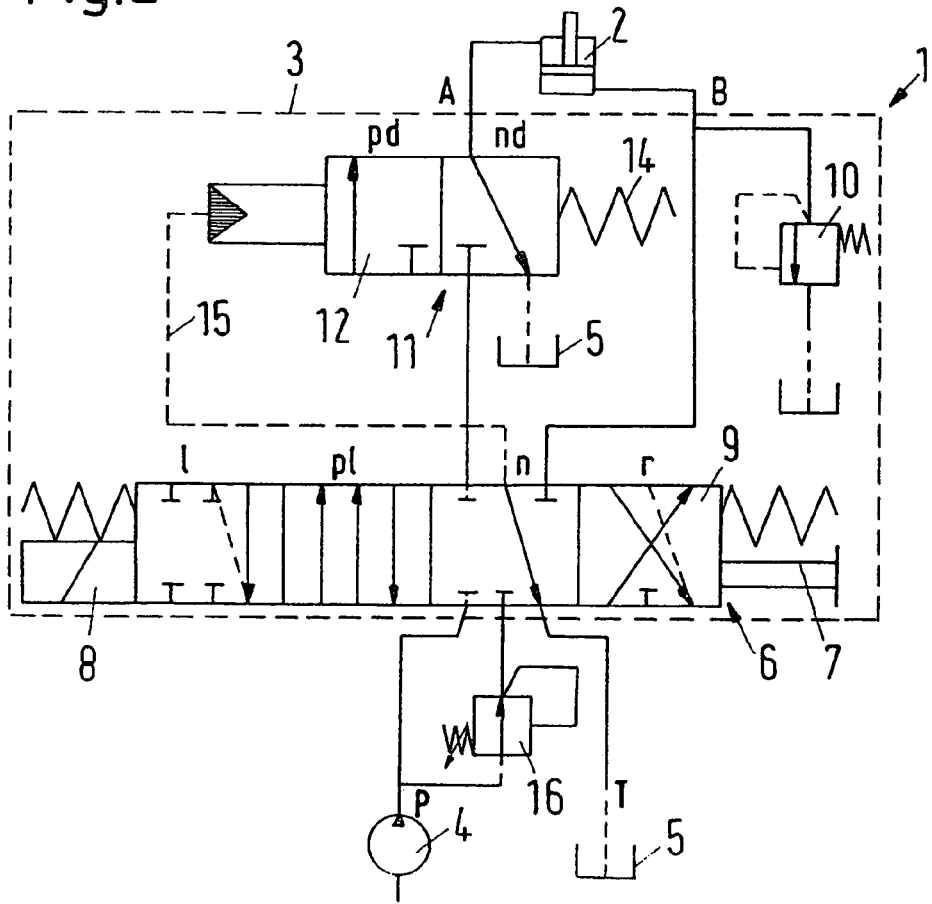
FIG. 2 shows a second embodiment of a lifting device

FIG. 2 shows an alternative embodiment, in which similar and corresponding parts have the same reference numbers.

Contrary to the embodiment according to FIG. 1, the changeover valve 11 is no longer controllable via an electromagnet, but via a pilot pressure line 15. The pilot pressure line 15 is led to the control valve 6 and connected with the tank in the neutral position n of the slide 9. The spring 14 thus moves the slide 12 of the changeover valve 11 to the position nd, so that the motor 2 is single-acting.

When the slide 9 of the control valve 6 is displaced to the lifting position R, the pilot pressure line 15 is also connected with the tank, that is, it remains in the position nd shown. The lifting connection B is connected with the pump connection, and the lowering connection A remains connected with the tank 5 via the changeover valve 11, as shown.

When now the slide 9 is displaced somewhat to the right, it passes, before reaching the lowering position l, an intermediary position pl, in which the pump connection P is connected with the changeover valve 11. At the same time, the pilot pressure line 15 is also connected with the pump connection P via an overpressure valve 16. Accordingly, the changeover valve is switched over, so that its slide reaches the position pd. In this case, the lowering connection of the motor 2 is supplied with pressurised hydraulic fluid directly from the pump connection P.

The control valve 6 does not only specify the direction of movement of the motor 2. Truly, discrete positions of the slide 9 of the changeover valve are shown. In fact, however, the slide 9 in the control valve 6 releases throttle openings more or less. When the slide is displaced from its neutral position n, it firstly releases throttle openings in such a manner that the motor 2 can move at a low speed. The more the slide 9 is displaced, the higher is the speed. Thus, the more the slide 9 is displaced to the right, the higher is the lowering speed. It can now be ensured that, when a certain limit is reached, for example 10% or 20% of the maximum speed, the position l of the slide 9 is reached, so that the pilot pressure line 15 is relieved to the tank again and the slide 12 of the change-over valve 11 switches to the position nd. With higher lowering speeds of the motor 2, thus only single-acting operation is possible.

Figure 3:
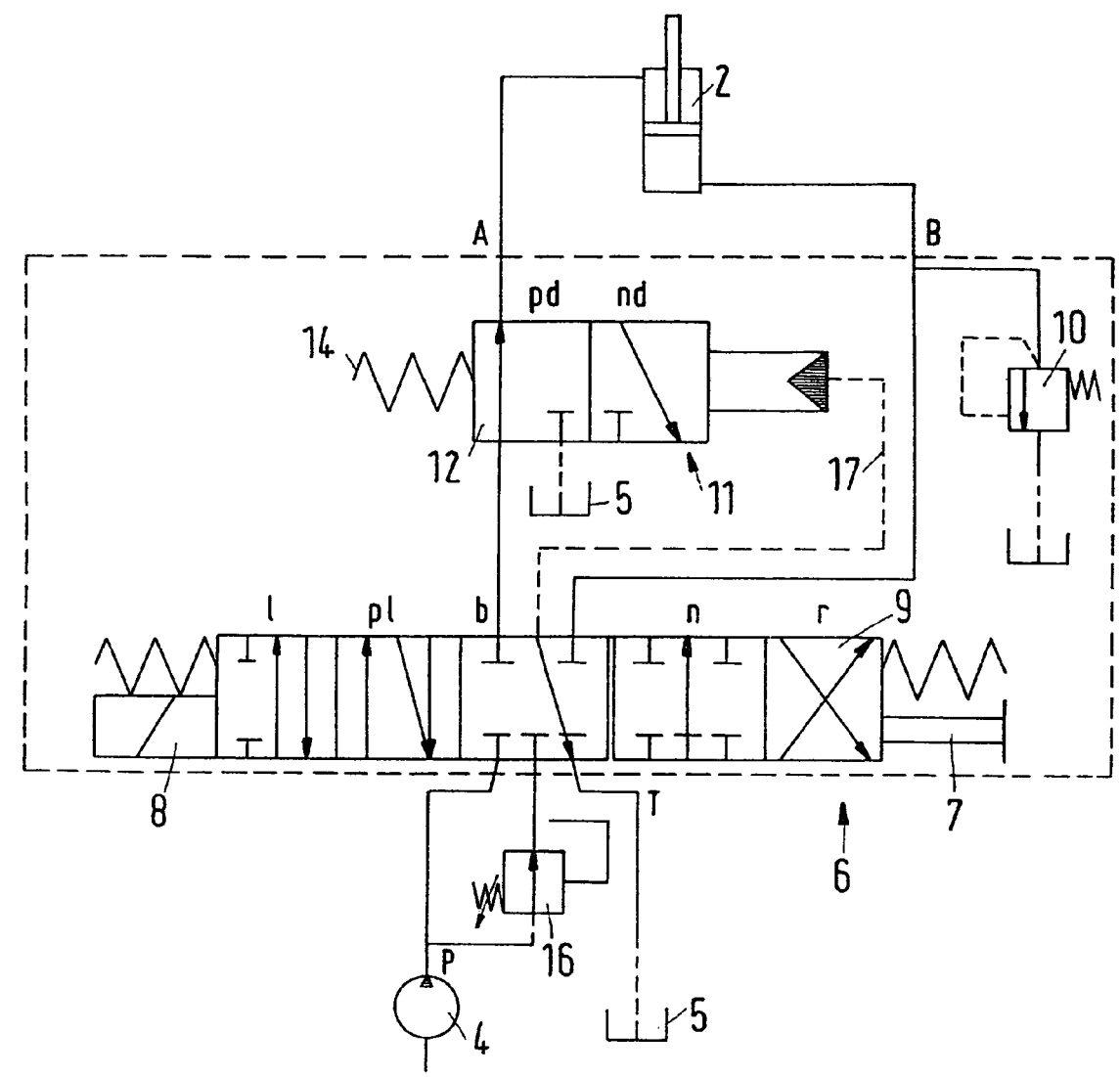
FIG. 3 shows a third embodiment of a lifting device

FIG. 3 shows an embodiment, which substantially corresponds to that of FIG. 2. Similar and corresponding parts have the same reference numbers.

Also in the embodiment according to FIG. 3 the changeover valve 11 is pilot controlled, that is, its slide 12 is acted upon by a spring 14 in the one direction and by a pressure in a pilot line 17 in the other direction. However, the position pd is the "resting position", that is, in the absence of a pressure the control valve 6 is connected directly with the lowering connection A via the change-over valve 11. Further to the positions known from the FIGS. 1 and 2, n (neutral), r (lifting), l (lowering) and pl (lowering under pressure), a position b is provided, a so-called locking position.

In the position r of the slide 9, pressurised hydraulic fluid reaches from the pump 4 to the lifting connection B. Fluid from the lowering connection A can flow off to the tank 5, and the position of the slide 12 of the change-over valve 11 is insignificant in this connection.

In the lowering position l, the lifting connection B is connected with the tank connection T via the slide 9 of the control valve 6. At the same time, the pilot pressure line 17 receives pressure from the overpressure valve 16, so that the slide 12 of the changeover valve 11 is displaced to the position nd, so that the motor 2 operates in the single-acting manner.

In the position n, the slide 12 of the changeover valve 11 is also displaced to the position nd, so that the lowering connection A is connected with the tank 5.

In the position pl of the slide 9 of the control valve 6, however, the control pressure line 17 is relieved to the tank connection T, so that the change-over valve 11 automatically assumes the position pd shown in FIG. 3, and pressurised fluid from the pump connection P can reach the lowering connection A through the slide 12, in order to operate the motor 2 in the double-acting manner.

In the additionally shown locking position b, both the lifting connection B and the lowering connection A are locked, the pilot pressure line 17 being relieved to the tank connection T and merely the spring 14 acting upon the slide 12 of the change-over valve 11 ensuring that also the lowering connection A has no connection to the tank. In the locking position b of the slide 9, the motor 2 remains in its once assumed position.

Figure 4:
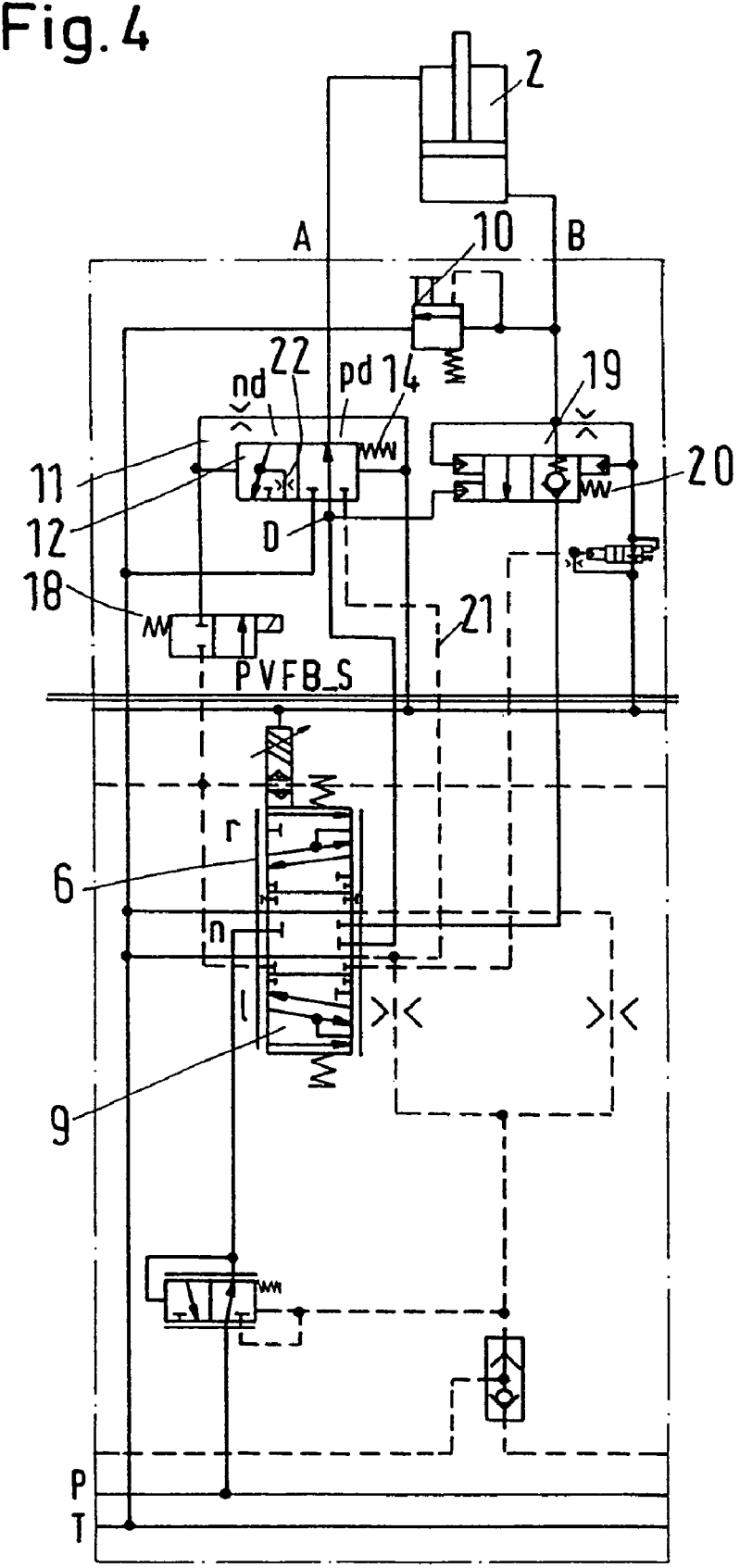
FIG. 4 shows a fourth embodiment of a lifting device

FIG. 4 shows schematically the location of the changeover valve 11 in a traditional lifting device, which has until now only been equipped with the control valve 6. The embodiment with the control valve 6 is known per se and will not be explained in detail.

A pilot valve 18 in the form of a solenoid valve controls the changeover valve 11. In the line between the control valve 6 and the lifting connection B is located a non-return valve 19, which can be opened by a pressure at a point d in front of the changeover valve 11. In the opposite direction, that is, the closing direction, the force of a spring 20 is acting.

In the following, the function will be described briefly:

In the shown position pd of the changeover valve 11, pressurised fluid from the pump connection P will reach the lifting connection B, when the slide 9 of the control valve 6 is displaced downwards. The non-return valve 19 is opened. Fluid flowing back via the lowering connection A gets back to the control valve 6 through the changeover valve 11.

When the control valve 6 is adjusted in the other direction, that is, the slide 9 is displaced upwards (in relation to FIG. 4), pressurised fluid from the pump connection P reaches the lowering connection A. However, fluid cannot escape via the lifting connection B yet, as the non-return valve 19 is closed. Over a period, however, a pressure will build up at the point D in front of the change-over valve 11, which pressure is sufficient to open the non-return valve 19 against the force of the spring 20, so that a controlled lowering movement of the motor 2 can take place.

In this case, the motor 2 is operated in the double-acting manner.

When the changeover valve 11 is switched to the position nd, the lowering connection A is connected with the tank connection T, in the first line independently of the position of the control valve 6.

A connection from the control valve 6 to the lowering connection A is interrupted. Thus, when the control valve is displaced to the lowering position l, pressurised hydraulic fluid reaches point D, where it builds up a pressure, which is sufficient to open the non-return valve 19.

In the position l of the control valve 6, an LS-line 21, which is connected with a merely schematically shown load-sensing system, carries the pressure of the pump connection P, which should in fact reach the lowering connection A, but cannot do this, as this is prevented by the change-over valve 11. As the pressure in the LS-line 21 usually controls the pressure at the pressure connection P, this would, without additional measures, lead to a substantial pressure increase at the pressure connection P. If the LS-line 21 were connected directly with the tank connection, a pressure loss would no longer occur on the LS-line 21. In this case, however, the pressure at the pump connection would also drop so much that an opening of the non-return valve 19 would no longer be possible.

Therefore, a throttle 22 is used in the slide 12 of the changeover valve 11, to connect the load-sensing line 21 with the tank connection T, when the slide 12 of the changeover valve 11 is in the position nd. The throttle 22 generates a pressure in the load-sensing line 21, which is sufficient to open the non-return valve 19. This pressure is then available at the pump connection P.

The switching over of the changeover valve 11 takes place via the pilot valve 18. In the position of the pilot valve 18 shown in FIG. 4, the change-over valve remains in the position pd, as it is moved there by the force of the spring 14. When the changeover valve 18 is switched over, the hydraulic pressure acting upon the opposite side of the slide 12 overrules the force of the spring 14, and the valve can be switched over to the position nd.

With the embodiment shown in FIG. 4 a real float position function is possible. When, by means of the control valve 6 the tank connection T is connected with the working connection A and at the same time the change-over valve 11 is switched to the position nd, both working connections A, B are connected directly with the tank.

A number of operating situations exist, in which, for a shorter or longer period, it is desired to switch to the double-acting function of the motor 2. For example, it is possible to shift the weight of a vehicle to an attachment, when, for example, a pressure of 50 bar is used for the lowering movement. Another example concerns the ploughing, where usually a single-acting function of the drive is preferred. In some cases, however, it is difficult to bring the plough to the correct working depth fast enough. Here, it can be provided, by means of the driving device that the double-acting function is used with a defined pressure, until the correct working depth has been reached. Then, switching to the single-acting function can be performed, so that the plough can avoid hindrances occurring in the earth, for example a big stone.

What is claimed is:

1. A driving device comprising:
   a drive in the form of a hydraulic motor;
   said drive having a lifting connection and a lowering connection;
   a pump and a control valve arrangement between the drive and the pump; and
   wherein from a first operating state, in which the motor is driven in a single-acting manner, the control valve arrangement can be switched to a second operating state, in which the motor is driven in a double-acting manner, and in both first and second operating states the control valve arrangement includes a neutral position, the lifting connection being closed when the control valve is in the neutral position.

2. The device according to claim 1, wherein the motor is in the form of a hydraulic cylinder.

3. A driving device comprising:
   a drive in the form of a hydraulic motor;
   said drive having a lifting connection and a lowering connection ;
   a pump and a control valve arrangement between the drive and the pump; and
   wherein from a first operating state, in which the motor is driving in a single-acting manner, the control valve arrangement can be switched to a second operating state, in which the motor is driving in a double-acting manner, the control valve arrangement includes a control valve for controlling one movement direction of the motor and a change-over valve, by which the motor can be switched between its single-acting function and its double-acting function, and the changeover valve is connected with the lowering connection of the motor.

4. The device according to claim 3, wherein the changeover valve is located between the control valve and the motor.

5. The device according to claim 3, wherein the control valve has a locking position, in which the changeover valve is locked so that the connection of the motor connected with the changeover valve is closed.

6. The device according to claim 3, wherein the changeover valve can be activated electrically.

7. A driving device comprising:
   a drive in the form of a hydraulic motor;
   said drive having a lifting connection and a lowering connection ;
   a pump and a control valve arrangement between the drive and the pump; and
   wherein from a first operating state, in which the motor is driving in a single-acting manner, the control valve arrangement can be switched to a second operating state, in which the motor is driving in a double-acting manner, the control valve arrangement includes a control valve for controlling one movement direction of the motor and a change-over valve, by which the motor can be switched between its single-acting function and its double-acting function, and the changeover valve is pilot controlled via the control valve.

8. The device according to claim 7, wherein the control valve sets a double-acting function of the drive in an area, in which the lowering speed is in the lower end of the speed range of the drive.

9. A driving device comprising:
   a drive in the form of a hydraulic motor;
   said drive having a lifting connection and a lowering connection;
   a pump and a control valve arrangement between the drive and the pump; and
   a controllable non-return valve located between the pump and the lifting connection;
   wherein from a first operating state, in which the motor is driving in a single-acting manner, the control valve arrangement can be switched to a second operating state, in which the motor is driving in a double-acting manner, the control valve arrangement includes a control valve for controlling one movement direction of the motor and a change-over valve, by which the motor can be switched between its single-acting function and its double-acting function, and the non-return valve being openable by pressure exerted in front of the changeover valve.

10. The device according to claim 9, wherein the changeover valve has a throttle, which, in the single-acting position, connects an LS-line of the lowering connection with a tank connection.

* * * * *

UNITED STATES PATENT AND TRADEMARK OFFICE
CERTIFICATE OF CORRECTION

PATENT NO. : 7,036,421 B2
APPLICATION NO. : 10/797684
DATED : May 2, 2006
INVENTOR(S) : Joergensen It is certified that error appears in the above-identified patent and that said Letters Patent is hereby corrected as shown below:

Column 7, Claim 3, line 61, please delete the word "driving" and replace with --driven--.

Column 8, Claim 3, line 1, please delete the word "driving" and replace with --driven--.

Column 8, Claim 7, line 24, please delete the word "driving" and replace with --driven--.

Column 8, Claim 7, line 26, please delete the word "driving" and replace with --driven--.

Column 8, Claim 9, line 47, please delete the word "driving" and replace with --driven--.

Column 8, Claim 9, line 49, please delete the word "driving" and replace with --driven--.

Signed and Sealed this

Fifteenth Day of August, 2006

JON W. DUDAS
*Director of the United States Patent and Trademark Office*